United States Patent
Wang et al.

(10) Patent No.: US 10,180,976 B2
(45) Date of Patent: Jan. 15, 2019

(54) METHOD AND DEVICE FOR MINING AN INFORMATION TEMPLATE

(71) Applicant: Xiaomi Inc., Beijing (CN)

(72) Inventors: Pingze Wang, Beijing (CN); Tao Zhang, Beijing (CN); Zhijun Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 86 days.

(21) Appl. No.: 15/209,947

(22) Filed: Jul. 14, 2016

(65) Prior Publication Data
US 2017/0140026 A1 May 18, 2017

(30) Foreign Application Priority Data
Nov. 17, 2015 (CN) .......................... 2015 1 0791533

(51) Int. Cl.
*G06F 17/30* (2006.01)
*G06F 21/72* (2013.01)

(52) U.S. Cl.
CPC .. *G06F 17/30598* (2013.01); *G06F 17/30997* (2013.01); *G06F 21/72* (2013.01); *G06F 2221/2107* (2013.01)

(58) Field of Classification Search
CPC ......... G06F 17/30598; G06F 17/30554; G06F 17/30572; G06F 21/72
See application file for complete search history.

(56) References Cited

U.S. PATENT DOCUMENTS 6,748,367 B1    6/2004   Lee
7,249,048 B1 *   7/2007   O'Flaherty ....... G06F 17/30398
                                                                                                      705/7.27

(Continued)

FOREIGN PATENT DOCUMENTS

CN      101520784 A    9/2009
CN      103024746 A    4/2013
(Continued)

OTHER PUBLICATIONS

English Translation of International Search Report dated Aug. 23, 2016 for International Application No. PCT/CN2015/099400, 4 pages.

(Continued)

*Primary Examiner* — Dao Q Ho
(74) *Attorney, Agent, or Firm* — Brinks, Gilson & Lione

(57) ABSTRACT

Methods and devices for mining an information template are provided. A method may include forming a modeling information set comprising a plurality of modeling information items. The method may further include creating a plurality of encrypted information items by encrypting respective numerical information items included in the plurality of modeling information items. The method may further include clustering the plurality of encrypted information items to create at least one information template. According to the present disclosure, an information template may be mined through analysis of a plurality of modeling information items, and numerical information items included in the modeling information items may be encrypted during the template mining process, which may prevent users' private information from being disclosed by the mined template, so that a more secure method for mining an information template may be provided.

24 Claims, 2 Drawing Sheets

(56) References Cited

U.S. PATENT DOCUMENTS

| | | | |
|---|---|---|---|
| 7,908,656 B1 | 3/2011 | Mu | |
| 2007/0214136 A1* | 9/2007 | MacLennan | G06F 17/30539 |
| 2008/0077544 A1* | 3/2008 | Sureka | G06K 9/6253 |
| | | | 706/13 |
| 2011/0231384 A1* | 9/2011 | Koroteyev | G06F 17/30734 |
| | | | 707/709 |
| 2012/0136684 A1* | 5/2012 | Pulido De Los Reyes | |
| | | | G06Q 10/067 |
| | | | 705/7.11 |
| 2013/0095864 A1* | 4/2013 | Marovets | H04W 4/14 |
| | | | 455/466 |
| 2014/0280287 A1* | 9/2014 | Ganti | G06F 17/30554 |
| | | | 707/766 |

FOREIGN PATENT DOCUMENTS

| | | |
|---|---|---|
| CN | 103246676 A | 8/2013 |
| CN | 104951432 A | 9/2015 |
| CN | 104991955 A | 10/2015 |
| CN | 105120440 A | 12/2015 |
| CN | 105468694 A | 4/2016 |
| JP | 09-223129 A | 8/1997 |
| JP | 2006-268378 A | 10/2006 |
| JP | 2015-036891 A | 2/2015 |
| JP | 2015-138343 A | 7/2015 |
| JP | 2015-172880 A | 10/2015 |
| JP | 2015-179399 A | 10/2015 |
| KR | 10-1538745 B1 | 7/2015 |
| KR | 10-2015-0089116 A | 8/2015 |
| RU | 2 558 617 C2 | 8/2015 |
| WO | WO 2012/070931 A | 5/2012 |

OTHER PUBLICATIONS

Extended European Search Report dated Apr. 5, 2017 for European Application No. 16199364.7, 6 pages.

Office Action dated Jan. 14, 2017 for Korean Application No. 10-2016-7005159, 6 pages.

Office Action dated Jun. 26, 2017 for Russian Application No. 2016114552/08, 10 pages.

Ouerhani, Y. et al., "Numerical Implementation of the Multiple Image Optical Compression and Encryption Technique," Optical Pattern Recognition XXVI, Proc. of SPIE, vol. 9477, 2015, pp. 94770M1-94770M5.

Office Action dated Jan. 30, 2018 for Japanese Application No. 2016-516607, 6 pages.

International Search Report dated Aug. 23, 2016 for International Application No. PCT/CN2015/099400, 5 pages.

Office Action dated Jun. 5, 2018 for Chinese Application No. 201510791533.0, 7 pages.

Notice of Allowance dated Aug. 30, 2018 for Japanese Application No. 2016-516607, 3 pages.

\* cited by examiner

METHOD AND DEVICE FOR MINING AN INFORMATION TEMPLATE

CROSS-REFERENCE TO RELATED APPLICATIONS

This application is based upon and claims priority to Chinese Patent Application No. 201510791533.0, filed Nov. 17, 2015, the entire contents of which are incorporated herein by reference.

TECHNICAL FIELD

The present disclosure relates to the technical field of information processing, and more particularly, to methods and devices for mining an information template.

BACKGROUND

In modern life, users will nearly every day receive much information sent in such formats as short message, e-mail, and instant message. Analyses of such information have found that such information often has similar text frameworks, and information templates mined on the basis of these text frameworks are very important to aspects such as improving user experience and promoting natural language processing technologies.

Frequent sequence mining is a common method for mining an information template. Frequent sequence mining mines information templates from mass information using a preset frequency threshold. During practical application, if the frequency of certain information is higher than the preset frequency threshold, then the information is used as the information template.

SUMMARY

The present disclosure provides methods and devices for mining an information template.

According to a first aspect of embodiments of the present disclosure, there is provided a method for mining an information template. The method may include forming a modeling information set comprising a plurality of modeling information items. The method may further include creating a plurality of encrypted information items by encrypting respective numerical information items included in the plurality of modeling information items. The method may further include clustering the plurality of encrypted information items to create at least one information template.

According to a second aspect of embodiments of the present disclosure, there is provided a device for mining an information template. The device may include a processor and a memory for storing instructions executable by the processor. The processor may be configured to form a modeling information set comprising a plurality of modeling information items. The processor may be further configured to create a plurality of encrypted information items by encrypting respective numerical information items included in the plurality of modeling information items. The processor may be further configured to cluster the plurality of encrypted information items to create at least one information template.

According to a third aspect of the embodiments of the present disclosure, there is provided a non-transitory computer-readable storage medium including instructions for mining an information template. The instructions may be configured to, when executed by a processor in a server, cause the server to form a modeling information set comprising a plurality of modeling information items. The instructions may be further configured to, when executed by a processor in a server, cause the server to create a plurality of encrypted information items by encrypting respective numerical information items included in the plurality of modeling information items. The instructions may be further configured to, when executed by a processor in a server, cause the server to cluster the plurality of encrypted information items to create at least one information template.

Both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with some aspects related to the disclosure and the appended claims.

Figure 1:
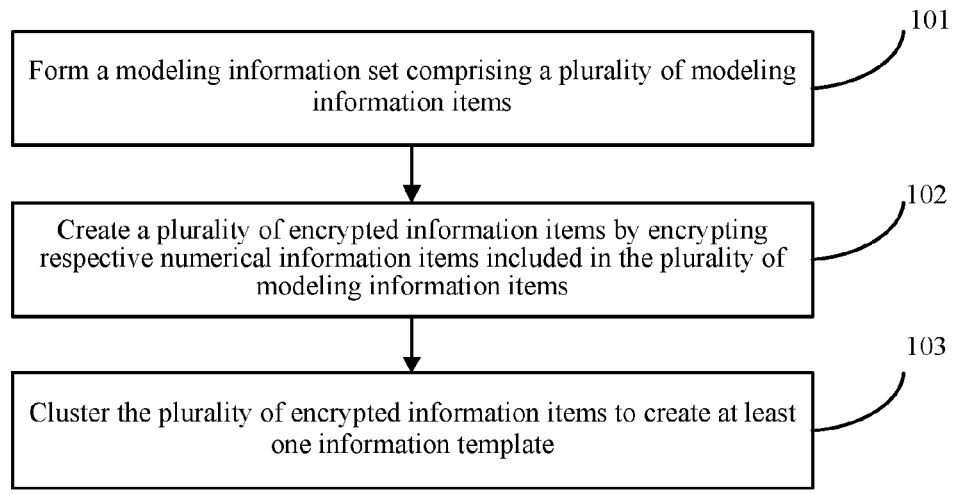
FIG. 1 is a flow chart of a method for mining an information template, according to an exemplary embodiment.

FIG. 1 is a flow chart of a method for mining an information template, according to an exemplary embodiment. As shown in FIG. 1, a method for mining an information template may be executed in a server, and may include the following steps.

In step 101, a modeling information set is formed, the modeling information set including a plurality of modeling information items.

In step 102, a plurality of encrypted information items are created, wherein creating the plurality of encrypted information items comprises encrypting respective numerical information items included in modeling information items of the plurality of modeling information items.

In step 103, the plurality of encrypted information items are clustered to create at least one information template.

According to methods provided by embodiments of the present disclosure, an information template is mined (excavated) through analysis of a plurality of modeling information items, and a numerical information item included in a modeling information item is encrypted during the process of mining the template, which prevents private user information from being disclosed by the mined template, so that a more secure method for mining an information template may be provided.

In an embodiment of the present disclosure, forming the modeling information set may include acquiring a plurality of information items to be processed, each of the plurality of information items to be processed comprising a respective sender identity. Forming the modeling information set may further include dividing the plurality of information items to be processed into different information sets, such that each of the plurality of information items to be processed included in an information set of the different information sets has a same sender identity as each other of the plurality of information items to be processed included in the information set. Forming the modeling information set may further include acquiring, from an information set of the different information sets, a first predetermined number of the plurality of information items to be processed. Forming the modeling information set may further include including, as modeling information items in the modeling information set, the first predetermined number of the plurality of information items to be processed.

In an embodiment of the present disclosure, creating the plurality of encrypted information items may include, for a modeling information item of the plurality of modeling information items, determining a respective territory identity of the modeling information item according to a respective receiver identity of the modeling information item. Creating the plurality of encrypted information items may further include, for the modeling information item of the plurality of modeling information items, encrypting the respective receiver identity of the modeling information item, to generate a respective first feature code of the modeling information item. Creating the plurality of encrypted information items may further include, for the modeling information item of the plurality of modeling information items, encrypting a respective numerical information item in the modeling information item according to a type of the respective numerical information item in the modeling information item, to generate a respective second feature code of the modeling information item. Creating the plurality of encrypted information items may further include, for the modeling information item of the plurality of modeling information items, including, in a respective encrypted information item: the respective territory identity, the respective first feature code, the respective second feature code, and a respective receiving time of the modeling information item.

In an embodiment of the present disclosure, clustering the plurality of encrypted information items to create at the least one information template may include consolidating encrypted information items of the plurality of encrypted information items that have same respective first consolidation conditions, to create a plurality of first consolidated information items. Clustering the plurality of encrypted information items to create at the least one information template may further include consolidating encrypted information items that are included in the plurality of first consolidated information items and that have same respective second consolidation conditions, to create a plurality of second consolidated information items. Clustering the plurality of encrypted information items to create at the least one information template may further include clustering the plurality of second consolidated information items to create the at least one information template.

In an embodiment of the present disclosure, consolidating the encrypted information items of the plurality of encrypted information items that have the same respective first consolidation conditions, to create the plurality of first consolidated information items, may include forming a plurality of first target encrypted information blocks from the plurality of encrypted information items, such that each of the plurality of encrypted information items included in a first target encrypted information block of the plurality of first target encrypted information blocks has a same territory identity, a same first feature code, and a same second feature code as each other of the plurality of encrypted information items included in the first target encrypted information block. Consolidating the encrypted information items of the plurality of encrypted information items that have the same respective first consolidation conditions, to create the plurality of first consolidated information items, may further include, for a first target encrypted information block of the plurality of first target encrypted information blocks, sorting encrypted information items in the first target encrypted information block according to receiving times of each of the encrypted information items in the first target encrypted information block, from most recent to least recent. Consolidating the encrypted information items of the plurality of encrypted information items that have the same respective first consolidation conditions, to create the plurality of first consolidated information items, may further include, for the first target encrypted information block of the plurality of first target encrypted information blocks, saving an encrypted information item in the respective first target encrypted information block having a latest receiving time and deleting each other encrypted information item in the first target encrypted information block, to create a respective first consolidated information item.

In an embodiment of the present disclosure, consolidating the encrypted information items that are included in the plurality of first consolidated information items and that have the same respective second consolidation conditions, to create the plurality of second consolidated information items, may include forming a plurality of second target encrypted information blocks from the plurality of first consolidated information items, such that each of the plurality of first consolidated information items included in a second target encrypted information block of the plurality of second target encrypted information blocks has a same territory identity and a same second feature code as each other of the plurality of first consolidated information items included in the second target encrypted information block. Consolidating the encrypted information items that are included in the plurality of first consolidated information items and that have the same respective second consolidation conditions, to create the plurality of second consolidated information items, may include, for a second target encrypted information block of the plurality of second target encrypted information blocks, determining a respective number of first consolidated information items included in the second target encrypted information block. Consolidating the encrypted information items that are included in the plurality of first consolidated information items and that have the same respective second consolidation conditions, to create the plurality of second consolidated information items, may include, for the second target encrypted information block of the plurality of second target encrypted information blocks, determining a respective latest receiving time of the first consolidated information items in the second target encrypted information block. Consolidating the encrypted information items that are included in the plurality of first consolidated information items and that have the same respective second consolidation conditions, to create the plurality of second consolidated information items, may include, for the second target encrypted information block of the plurality of second target encrypted information blocks, including, in a respective second consolidated information item: a respective territory identity of the second target encrypted information block, the respective determined number of items of first consolidated information included in the second target encrypted information block, a respective second feature code of the second target encrypted information block, and the respective latest receiving time of items of first consolidated information in the second target encrypted information block.

In an embodiment of the present disclosure, clustering the plurality of second consolidated information items to create the at least one information template may include dividing the plurality of second consolidated information items into a plurality of third target encrypted information blocks, such that each of the plurality of second consolidated information items included in a third target encrypted information block of the plurality of third target encrypted information blocks has a same territory identity as each other of the plurality of second consolidated information items included in the third target encrypted information block. Clustering the plurality of second consolidated information items to create the at least one information template may further include determining a number of first consolidated information items that are consolidated by a second consolidated information item in a third target encrypted information block of the plurality of third target encrypted information blocks. Clustering the plurality of second consolidated information items to create the at least one information template may further include when the determined number of first consolidated information items that are consolidated by the second consolidated information item is greater than a first threshold, including, in an entry: information contents corresponding to the second consolidated information item, the determined number of first consolidated information items that are consolidated by the second consolidated information item, and the latest receiving time of second consolidated information items in the third target encrypted information block. Clustering the plurality of second consolidated information items to create the at least one information template may further include consolidating a plurality of entries included in the third target encrypted information block to create an information template, each of the plurality of entries having same information contents as each other of the plurality of entries, wherein a number of encrypted information items that are applicable to the created information template is a sum of respective numbers of encrypted information items that are consolidated by each of the plurality of entries, and the receiving time of the created information template is the latest receiving time of the plurality of entries.

In an embodiment of the present disclosure, the method may further include, after clustering the plurality of encrypted information items to create the at least one information template, verifying a coverage rate for the at least one information template. The method may further include, after clustering the plurality of encrypted information items to create the at least one information template, determining whether to set the at least one information template as an actual information template based on a result of the verifying of the coverage rate.

In an embodiment of the present disclosure, verifying the coverage rate for the at least one information template may include forming a test information set, the test information set comprising a plurality of test information items. Verifying the coverage rate for the at least one information template may further include processing test information items of the plurality of test information items to form a plurality of first test information blocks. Verifying the coverage rate for the at least one information template may further include verifying a coverage rate for the at least one information template based on the plurality of first test information blocks.

In an embodiment of the present disclosure, forming the test information set may include forming the test information set by acquiring, from the plurality of information items to be processed, a second predetermined number of the plurality of information items to be processed, the second predetermined number of the plurality of information items to be processed having a same sender identify as the first predetermined number of the plurality of information items to be processed, and the second predetermined number of the plurality of information items to be processed not included as modeling information items in the modeling information set.

In an embodiment of the present disclosure, processing test information items of the plurality of test information items to form the plurality of first test information blocks may include encrypting the plurality of test information items to create a plurality of encrypted test information items. Processing test information items of the plurality of test information items to form the plurality of first test information blocks may further include consolidating encrypted test information items of the plurality of encrypted test information items that have same respective third consolidation conditions, to create a plurality of third consolidated information items. Processing test information items of the plurality of test information items to form the plurality of first test information blocks may further include dividing the plurality of third consolidated information items into a plurality of first test information blocks, such that each of the plurality of third consolidated information items included in a first test information block of the plurality of test information blocks has a same territory identity as each other third consolidated information item included in the first test information block.

In an embodiment of the present disclosure, encrypting the plurality of test information items to create the plurality of encrypted test information items may include, for a test information item of the plurality of test information items, determining a respective territory identity of the test information item according to a respective receiver identity of the test information item. Encrypting the plurality of test information items to create the plurality of encrypted test information items may further include, for the test information item of the plurality of test information items, encrypting the respective receiver identity of the test information item to generate a respective first feature code of the test information item. Encrypting the plurality of test information items to create the plurality of encrypted test information items may further include, for the test information item of the plurality of test information items, including, in a respective encrypted test information item: the respective territory identity of the test information item, the respective first feature code of the test information item, and respective information contents of the test information item.

In an embodiment of the present disclosure, consolidating encrypted test information items of the plurality of encrypted test information items that have the same respective third consolidation conditions, to create a plurality of third consolidated information items, may include forming a plurality of second test information blocks from the plurality of encrypted test information items, such that each of the plurality of encrypted test information items included in a second test information block of the plurality of second test information blocks has a same territory identity and same information contents as each other of the plurality of encrypted test information items included in the second test information block. Consolidating encrypted test information items of the plurality of encrypted test information items that have the same respective third consolidation conditions, to create a plurality of third consolidated information items, may further include, for a second test information block of the plurality of second test information blocks, determining a respective number of encrypted test information items included in the second test information block. Consolidating encrypted test information items of the plurality of encrypted test information items that have the same respective third consolidation conditions, to create a plurality of third consolidated information items, may further include, for the second test information block of the plurality of second test information blocks, including, in a respective third consolidated information item: a respective territory identity of the second test information block, the respective determined number of encrypted test information items included in the second test information block, and respective information contents of the second test information block.

In an embodiment of the present disclosure, verifying the coverage rate for the at least one information template based on the plurality of first test information blocks may include determining a respective number of test information items included in a first test information block of the plurality of first information blocks that have information contents that match with information contents of the at least one information template. Verifying the coverage rate for the at least one information template based on the plurality of first test information blocks may further include, when the respective determined number of test information items included in the first test information block that have information contents that match with the information contents of the at least one information template is greater than a second threshold, determining a ratio between (i) the respective determined number of test information items included in the first test information block that have information contents that match with the information contents of the at least one information template and (ii) a respective number of test information items included in the first test information block.

In an embodiment of the present disclosure, determining whether to set the at least one information template as the actual information template based on the result of the verifying of the coverage rate may include when the determined ratio is within a preset range, setting the at least one information template to be the actual information template.

All the above-mentioned optional technical solutions may be combined in any manner to form one or more optional embodiments of the present disclosure, and each contemplated embodiment will not be elaborated on one by one herein.

Figure 2:
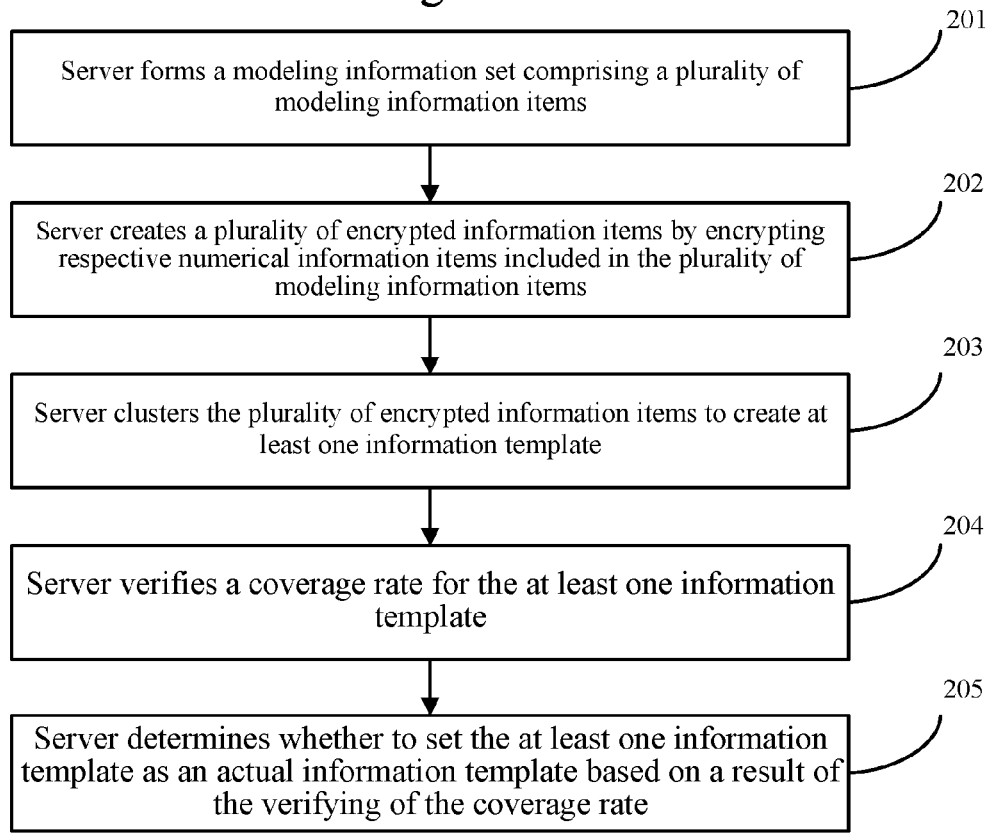
FIG. 2 is a flow chart of a method for mining an information template, according to an exemplary embodiment.

FIG. 2 is a flow chart of a method for mining an information template, according to an exemplary embodiment. As shown in FIG. 2, a method for mining an information template may be executed in a server, and may include the following steps.

In step 201, a server forms a modeling information set, the modeling information set including a plurality of modeling information items.

In modern life, users will almost daily receive notification information items sent by service providers through such manners as short message, email and instant message. To send these information items, generally, a uniform information template will be employed. Respective related information of the users will be filled into the template by servers of the service providers, and a respective information item will then be automatically sent to each user. By analyzing these information items, information templates applied for these information items may be mined. The resulting information templates can help users understand the latest news of the service providers, improve user experience, and promote the development of natural language processing technologies.

Because different types of information items relate to different service providers, and the information contents sent by the servers of different service providers are often different, in order to conduct targeted template mining and improve the accuracy of the mined information templates, if may be preferable that a template mining method collects information items of different types to use in mining the information templates, so as to mine respective information templates for those particular types of information items.

For example, the server may collect various short messages sent to the users by the servers of such service providers as China Mobile, China Telecom and China Unicom, so as to mine information templates from the collected short messages. The server may also collect instant messages sent to the users by different instant messaging application servers, so as to mine information templates from the collected instant messages. The server may also collect notification mails sent to users by different e-mail servers, so as to mine information templates from the collected notification e-mails.

The quantity of collected information items to be processed can be large, and it may be very slow to mine information templates using all of the collected information items to be processed, so the server may form a modeling information set from the collected information items to be processed. The modeling information set may include a plurality of modeling information items, the modeling information items being information items to be processed to mine the information template. As an example, the following steps 201-1-201-4 may be employed by the server to form a modeling information set.

In step 201-1, the server acquires a plurality of information items to be processed, each of the plurality of information items to be processed comprising a respective sender identity.

The server, while acquiring the plurality of information items to be processed, may collect information items sent to the users from the respective servers of each service provider, so as to use the collected information items as the acquired plurality of information items to be processed. In an embodiment, each information item to be processed may include at least a sender identity, a receiver identity, an information item receiving time, or the like. If the information item to be processed is a short message, then the sender identity included in each information item to be processed may be a number (such as a phone number) of a sender, and the receiver identity may be a number (such as a phone number) of a receiver. If the information to be processed is an e-mail, then the sender identity included in each information item to be processed may be a mailbox corresponding to a mail server, and the receiver identity may be a mailbox of the user. If the information to be processed is an instant message, then the sender identity included in each information item to be processed may be an instant communication number corresponding to an instant application server, and the receiver identity may be an instant communication number of the user, or the like.

Often, information items to be processed which are collected by the server may have been sent to a user by a server of a service provider at several different times, and some of these information items may be meaningless to the user because some of the information items may be too old, and thus information templates mined on the basis of the old information items may lose value due to being based on old information items. Therefore, in order to ensure the timeliness of mined information templates, the server may preset a designated time after acquiring a plurality of information items to be processed, and perform a primary screening of the information items to be processed based on the preset designated time, so as to save and analyze information items to be processed that have respective receiving times that are later than the designated time, and delete information items to be processed that have respective receiving times that are earlier than the preset designated time.

In step 201-2, the server divides the plurality of information items to be processed into different information sets, such that each of the plurality of information items to be processed included in an information set of the different information sets has a same sender identity as each other of the plurality of information items to be processed included in the information set.

The server divides information items to be processed that have the same sender identity into respective information sets according to the sender identity, so that information items to be processed in each respective resulting information set have the same respective sender identity. By dividing the plurality of information items to be processed in this way, each respective information set may correspond to a respective sender identity in a one to one correspondence. For example, information items to be processed having a sender identity of 10086 may be divided into an information set A, and information items to be processed having a sender identity of 10011 may be divided into an information set B, or the like.

In step 201-3, the server acquires, from an information set of the different information sets, a first predetermined number of the plurality of information items to be processed.

In a present embodiment, a respective information set and a respective sender identity are in a one to one correspondence, and the server may form an information set that corresponds to any given sender identity. Because each information set includes a large number of information items to be processed, operating complexity may be high if mining the information template uses all of the information items to be processed. Thus in order to improve the speed of mining the information template, a method provided by a present embodiment may acquire a subset of the information items to be processed from the formed information set to form one respective modeling information set. As an example, a first preset number of information items to be processed may be selected for inclusion in a modeling information set. A first preset number may be 1000, 2000, 3000 or the like, and the first preset number is not limited to these exemplary embodiments.

In step 201-4, the server includes, as modeling information items in the modeling information set, the first predetermined number of the plurality of information items to be processed.

Based on the acquired first preset number of information items to be processed, the server may include, as the modeling information items of a modeling information set, a subset of the plurality of information items to be processed that has a quantity of information items to be processed matching the first predetermined number.

Because an embodiment relates to various information items to be processed, in a present embodiment, to facilitate distinguishing various information items to be processed, the information items to be processed may be divided into modeling information items and test information items, according to different usages of the information items to be processed. The modeling information items are mainly used for mining the information template, and the test information items are mainly used for verifying the mined information templates.

In step 202, the server creates the plurality of encrypted information items by encrypting respective numerical information items included in modeling information items of the plurality of modeling information items.

Generally, information received by a user may include some private information, for example, a name, a phone number, a date of birth, a banking card number, a member card number, an amount of consumption, a validation code, an order bill number, or the like. In a present embodiment, the name may be a textual private information item, which may be referred to as a textual information item. The phone number, the date of birth, the banking card number, the member card number, the amount of consumption, the validation code, the order bill number, or the like may be numerical private information items, which may be referred to as numerical information items.

A textual private information item may be distinctive to a respective user, and different textual private information items are generally different for different users, or are at least not completely identical for different users. With regard to textual information items that lack distinctiveness, for example, textual statements such as "dear customers" or the like that frequently appear in short messages, the identity of the user cannot be deduced based on these textual information items, and therefore, the information items are not considered to be private information items. With regard to textual information items having distinctiveness, for example, peoples' names such as San ZHANG and Si LI or the like, related information like the identity of the user can be deduced using these textual information items. Therefore, in order to prevent the users' private information from being disclosed, the server may select a proper wildcard character to replace these information items.

In order to better protect the users' private information, with regard to numerical information items included in modeling information items, the server may encrypt these information items using an encryption algorithm to create a plurality of encrypted information items. The following steps 202-1-202-4 may be employed to perform a particular encryption process.

In step 202-1, the server, for a modeling information item of the plurality of modeling information items, determines a respective territory identity of the modeling information item according to a respective receiver identity of the modeling information item.

Often, different service providers use different information templates in different locations or regions according to different regional features. Because the respective receiver identities may indicate the respective locations or regions of different users, the server may determine the territory identity of a modeling information item according to the respective receiver identity of the respective modeling information item. The server may determine the respective territory identity of any or all of the plurality of modeling information items. In a present embodiment, a territory identity may generally be represented by place, and the respective territory identities (place) corresponding to different respective territory locations may each be different. For example, the territory identity of Beijing may be "beijing", and the territory identity of Shanghai may be "shanghai", or the like.

In step 202-2, the server encrypts the respective receiver identity of the modeling information item, to generate a respective first feature code of the modeling information item.

The server, while encrypting the receiver identity of the modeling information item, may employ a preset encryption algorithm for encryption, the preset encryption algorithm being determined by the server. A cipher text corresponding to the receiver identity of the modeling information item may be generated by encrypting the receiver identity of the modeling information item using the preset encryption algorithm. The resulting cipher text may be called the first feature code. In a present embodiment, the first feature code may be represented by ciphertext. The respective ciphertext of different receiver identities may be different. For example, the ciphertext of receiver identity 123456 may be set as a, and the ciphertext of receiver identity 258369 may be set as b, or the like.

The respective first feature codes generated by encrypting different receiver identities using the preset encryption algorithm may be different, such that a respective first feature code corresponding to each receiver identity is unique. In other words a respective receiver identity and a respective first feature code may be in a one to one correspondence, such that each receiver identity corresponds to only one first feature code, and vice versa.

In step 202-3, the server encrypts a respective numerical information item that is in the modeling information item, according to a type of the respective numerical information item that is in the modeling information item, to generate a respective second feature code of the modeling information item.

In a present embodiment, respective cipher texts corresponding to different types of numerical information items may be different. For example, if the type of numerical information item is a telephone number, then the cipher text corresponding to the numerical information item may be <Phone Number>; if the type of numerical information item is a date, then the cipher text corresponding to the numerical information item may be <Time>; and if the type of numerical information item is a numeral, then the cipher text corresponding to the numerical information item may be <Number>.

The server, while encrypting the numerical information item included in the modeling information item, may replace the corresponding numerical information item in the modeling information item with the respective cipher text corresponding to the type of the numerical information item, so as to generate the second feature code of the modeling information item. In a present embodiment, a second feature code may be generally represented by contentNew.

For example, if the type of a numerical information item in a modeling information item is a telephone number 10086, then the second feature code <Phone Number>, corresponding to the telephone number type numerical information item, is employed to replace 10086, so as to generate the second feature code <Phone Number> of the modeling information item.

In step 202-4, the server includes in a respective encrypted information item: the respective territory identity, the respective first feature code, the respective second feature code, and a respective receiving time of the modeling information item.

The server forms one encrypted information item by including in the encrypted information item: the territory identity, the first feature code, the second feature code, and the receiving time of the modeling information item. In a present embodiment, the receiving time may be generally represented by datetime. The encrypted information may be a tetrad of information that can be represented by <place, ciphertext, contentNew, datetime>.

The foregoing encrypting of a modeling information item in the modeling information set may be taken as an example that can, in practice, be applied in an identical manner to encrypting other modeling information items. The foregoing process of encrypting a modeling information item can be referred to for details, and will not be further elaborated herein.

In order to intuitively show a process conducted by the server on the numerical information items included in the plurality of modeling information items, a detailed explanation and illustration will be made hereinafter using a short message 1, a short message 2, and a short message 3 as examples.

For example, short message 1 is: [Bank] Dear Mr/Miss Fei LIU, you have changed your original mobile phone number (tail number 0102) into mobile phone number (tail number 0988) on Aug. 21, 2014, please use the new mobile phone number to transact e-banking business, and please call 95580 in case of any query.

Short message 2 is: [Bank] Dear Mr/Miss Jie ZHANG, you have changed your original mobile phone number (tail number 0209) into mobile phone number (tail number 0898) on Jul. 13, 2014, please use the new mobile phone number to transact e-banking business, and please call 95580 in case of any query.

Short message 3 is: [Bank] Dear Mr/Miss Changjiang WANG; you have changed your original mobile phone number (tail number 0109) into mobile phone number (tail number 1234) on Aug. 7, 2014, please use the new mobile phone number to transact e-banking business, and please call 95580 in case of any query.

Because short message 1, short message 2, and short message 3 involve such private information of the user as a time of a transaction, a mobile phone number, a telephone number, or the like, in order to protect the private information of the user, a method provided by an embodiment may encrypt the respective numerical information items included in these short messages. The following encrypted information items may be created after the encryption:

encrypted information item 1: [Bank] Dear Mr/Miss Fei LIU, you have changed your original mobile phone number (tail number <Number>) into mobile phone number (tail number <Number>) on <Time>, please use the new mobile phone number to transact e-banking business, and please call <Phone Number> in case of any query;

encrypted information item 2: [Bank] Dear Mr/Miss Jie ZHANG, you have changed your original mobile phone number (tail number <Number>) into mobile phone number (tail number <Number>) on <Time>, please use the new mobile phone number to transact e-banking business, and please call <Phone Number> in case of any query; and encrypted information item 3: [Bank] Dear Mr/Miss Changjiang WANG; you have changed your original mobile phone number (tail number <Number>) into mobile phone number (tail number <Number>) on <Time>, please use the new mobile phone number to transact e-banking business, and please call <Phone Number> in case of any query.

Moreover, in order to facilitate managing the encrypted information items, the server may form an encrypted information set including the plurality of encrypted information items. In a present embodiment, the encrypted information set may be represented by corpus1, and the corpus1 may include a plurality of tetrads of encrypted information which may be respectively represented by <place, ciphertext, contentNew, datetime>.

In step 203, the server clusters the plurality of encrypted information items to create at least one information template.

In order to reduce the complexity of the process of mining the information templates and improve the efficiency of mining the information templates, the server, may cluster the plurality of encrypted information items to create at least one information template.

In a present embodiment, a process for the server to cluster the plurality of encrypted information items to create at least one information template may be shown in the following steps 203-1-203-3.

In step 203-1, the server consolidates encrypted information items of the plurality of encrypted information items that have same respective first consolidation conditions, to create a plurality of first consolidated information items.

A first consolidation condition may be a territory identity, first feature code, and second feature code, or the like. A first consolidated information item may consolidate encrypted information items that each have the same first consolidation condition, i.e. encrypted information items that each have the same territory identity, first feature code, and second feature code as each other, by being representative of those encrypted information items.

An exemplary process for the server to consolidate encrypted information items of the plurality of encrypted information items that have same respective first consolidation conditions, to create a plurality of first consolidated information items, may be shown in the following steps 203-1-1-203-1-3.

In step 203-1-1, the server forms a plurality of first target encrypted information blocks from the plurality of encrypted information items, such that each of the plurality of encrypted information items included in a first target encrypted information block of the plurality of first target encrypted information blocks has a same territory identity, a same first feature code, and a same second feature code as each other of the plurality of encrypted information items included in the first target encrypted information block.

Because each encrypted information item may be generally represented by a tetrad of information including a territory identity, a first feature code, a second feature code, and a receiving time, the server may form one or more encrypted information blocks by acquiring and including in a respective encrypted information block those encrypted information items that are represented by a respective tetrad having the same respective territory identity, first feature code, and second feature code. The server may thus form a first target encrypted information block that includes encrypted information items that each have the same respective territory identity, first feature code, and second feature code as each other.

For example, the server may have created a plurality of encrypted information items, wherein encrypted information item 1 may be <beijing, a, Number, 2015/06/01/12:00:00>, encrypted information item 2 may be <beijing, a, Number, 2015/01/04/07:00:00>, encrypted information item 3 may be <beijing, a, Number, 2015/02/01/08:30>, encrypted information item 4 may be <tianjin, c, PhoneNumber, 2015/04/04/10:15:00>, encrypted information item 5 may be <tianjin, c, PhoneNumber, 2015/07/14/10:15:00>, and encrypted information item 6 may be <tianjin, c, PhoneNumber, 2015/07/12/06:20:00>. In a present embodiment, the server may then form into one respective first target encrypted information block encrypted information item 1, encrypted information item 2, and encrypted information item 3, because each of those encrypted information items has a respective territory identity of beijing, a respective first feature code of a, and a respective second feature code of Number. The server may further form into another first target encrypted information block encrypted information item 4, encrypted information item 5, and encrypted information item 6, because each of those encrypted information items has a respective territory identity of tianjin, a respective first feature code of c, and a respective second feature code of PhoneNumber.

In step 203-1-2, the server sorts encrypted information items in the first target encrypted information block according to receiving times of each of the encrypted information items in the first target encrypted information block, from most recent to least recent.

Using the encrypted information items in any first target encrypted information block as an example, the server may also sort, in a descending order, the encrypted information items in the first target encrypted information block according to the respective receiving times of the encrypted information items.

As an example, for the first target encrypted information block of the foregoing example, which includes encrypted information item 1, encrypted information item 2, and encrypted information item 3, the server sorts, in a descending order, the encrypted information items according to the respective receiving times of the encrypted information items, to create an ordered list of: encrypted information 1, encrypted information 2, and encrypted information 3.

In step 203-1-3, the server saves an encrypted information item in the respective first target encrypted information block having a latest receiving time and deletes each other encrypted information item in the first target encrypted information block, to create a respective first consolidated information item.

Often, information items having the same territory identity, first feature code, and second feature code are notification information items that have the same information contents as each other, which were sent by a service provider multiple times to the same user due to server failures. In order to reduce the amount of calculating involved in mining of the information templates, the server may save an encrypted information item that has the latest (i.e. most recent) receiving time in the first target encrypted information block, and delete the rest of the encrypted information items in that first target encrypted information block. An encrypted information item that has the latest receiving time out of the encrypted information items in a given first target encrypted information block may be referred to as a first consolidated information item.

For example, for a first target encrypted information block including encrypted information item 1 of <beijing, a, Number, 2015/06/01/12:00:00>, encrypted information item 2 of <beijing, a, Number, 2015/01/04/07:00:00>, and encrypted information 3 of <beijing, a, Number, 2015/02/01/08:30>, the server may save encrypted information item 1 and delete encrypted information 2 and encrypted information 3.

In step 203-2, the server respectively consolidates encrypted information items that are included in the plurality of first consolidated information items and that have same respective second consolidation conditions, to create a plurality of second consolidated information items.

A second consolidation condition may for example be a territory and second feature code, or the like.

Exemplarily, the process for the server to respectively consolidate the encrypted information satisfying the second consolidation condition in the plurality of first consolidated information items to create the plurality of second consolidated information items may be shown in the following steps 203-2-1-203-2-3.

In step 203-2-1, the server forms a plurality of first target encrypted information blocks from the plurality of encrypted information items, such that each of the plurality of encrypted information items included in a first target encrypted information block of the plurality of first target encrypted information blocks has a same territory identity, a same first feature code, and a same second feature code as each other of the plurality of encrypted information items included in the first target encrypted information block.

Because each first consolidated information item may generally be represented by a tetrad of information including a territory identity, a first feature code, a second feature code, and a receiving time, the server may form one or more second target encrypted information blocks by acquiring and including in a respective encrypted information block those first consolidated information items that are represented by a respective tetrad having the same respective territory identity and second feature code.

For example, the server may have consolidated encrypted information items having the same first consolidation condition to create the following plurality of first encrypted information items: first consolidated information item 1 is <shanghai, c, Number, 2015/07/03/10:00:00>, first consolidated information item 2 is <shanghai, a, Number, 2015/01/08/07:00:00>, first consolidated information item 3 is <beijing, b, PhoneNumber, 2015/02/05/08:30:12>, first consolidated information item 4 is <shanghai, b, PhoneNumber, 2014/07/18/09:00:02>, first consolidated information item 5 is <beijing, b, PhoneNumber, 2015/05/04/10:20:00>, and first consolidated information item 6 is <tianjin, c, PhoneNumber, 2015/07/12/06:20:00>. The server may then form into one second target encrypted information block first consolidated information item 1 and first consolidated information item 2, because each of those first consolidated information items has a respective territory identity of shanghai and a respective second feature code of Number. The server may further form into another second target encrypted information block first consolidated information item 3 and first consolidated information item 5, because each of those first consolidated information items has the territory identity of beijing and the second feature code of PhoneNumber.

In step 203-2-2, for a second target encrypted information block of the plurality of second target encrypted information blocks, the server determines a respective number of first consolidated information items included in the second target encrypted information block.

In a present embodiment, the number of the first consolidated information items that are in a respective second target encrypted information block may be 2, 3, or the like, and the number of first consolidated information items that are included in a respective second target encrypted information block is not limited to these examples. In a present embodiment, a number of first consolidated information items that are included in a second target encrypted information block may generally be represented by c1.

In a present embodiment, the server also sorts the first consolidated information items that are included in the second target encrypted information block according to the respective receiving times of the first consolidated information items, from latest (or most recent) to earliest (or least recent), and determines the latest receiving time of the first consolidated information items that are included in the second target encrypted information block according to the sorting result. In a present embodiment, a latest receiving time of a first consolidated information in a second target encrypted information block may generally be represented by latestdatetime1.

Taking as an example the foregoing second target encrypted information block including first consolidated information 3 and first consolidated information 5, the server may determine that the number of first consolidated information items in the second target encrypted information block is 2. Because the receiving time of first consolidated information item 3 is <2015/02/05/08:30:12>, and the receiving time of the first consolidated information item 5 is <2015/05/04/10:20:00>, the server may thus determine as the latest receiving time of the first consolidated information items in the second target encrypted information block a time of 2015/05/04/10:20:00.

In step 203-2-3, the server includes, in a respective second consolidated information item: a respective territory identity of the second target encrypted information block, the respective determined number of items of first consolidated information included in the second target encrypted information block, a respective second feature code of the second target encrypted information block, and the respective latest receiving time of items of first consolidated information in the second target encrypted information block.

In an embodiment, each second consolidated information item is generally represented by a tetrad of information of <place, c1, contentNew, latestdatetime1>. A second consolidated information item may consolidate first consolidated information items by being representative of the first consolidated information items that it consolidates.

The foregoing is an example of consolidating the plurality of first consolidated information items that are included in an exemplary second target encrypted information block. The exemplary process of consolidating the plurality of first consolidated information items may be applied to any other second target encrypted information blocks, and may be implemented with reference to the foregoing process of consolidating a plurality of first consolidated information items in a second target encrypted information block, and will not be elaborated further herein.

In order to facilitate managing the plurality of second consolidated information items, the server may also form the plurality of second consolidated information items into a set, which may be generally referred to as corpus2.

In step 203-3, the server clusters the plurality of second consolidated information items to create the at least one information template.

Although through the foregoing process the plurality of modeling information items in the modeling information set have been twice consolidated into a plurality of second consolidated information items, the number of the second consolidated information items remaining after the consolidating may still be too large, and a subset of second consolidated information items among these second consolidated information items may still have the same features as each other. Thus the server may further cluster the plurality of second consolidated information items to create the at least one information template.

In another embodiment of the present disclosure, the following steps 203-3-1-203-3-3 may be employed by the server clusters the plurality of second consolidated information items to create at least one information template.

In step 203-3-1, the server divides the plurality of second consolidated information items into a plurality of third target encrypted information blocks, such that each of the plurality of second consolidated information items included in a third target encrypted information block of the plurality of third target encrypted information blocks has a same territory identity as each other of the plurality of second consolidated information items included in the third target encrypted information block.

Often, the respective information contents in information items sent by service providers to users are different according to different territory features, and information templates mined by the server based on information items with different information contents will be different. Therefore, in order to conduct targeted information template mining, the server may divide the plurality of second consolidated information items into a plurality of third target encrypted information blocks based on the respective territory identities of the second consolidated information items, such that second consolidated information items included in a third target encrypted information block have the same respective territory identity as each other.

For example, the server may divide the set corpus2 into n disjoint subsets based on the respective territory identities of the second consolidated information items included in corpus2. For example, the subsets may include corpus2 (place1), corpus2 (place2), corpus2 (place3), . . . , corpus2 (placen). For any subset corpus2 (placei), the territory identity corresponding to each second consolidated information item included in the subset corpus2 (placei) is placei, and each second consolidated information item included in the subset corpus2 (placei) is a triad of information which may generally be represented by <count, countentNew, datetime>, where count refers to the number of second consolidated information items included in corpus2 (placei).

In step 203-3-2, the server determines a number of first consolidated information items that are consolidated by a second consolidated information item in a third target encrypted information block of the plurality of third target encrypted information blocks, and then when the determined number of first consolidated information items that are consolidated by the second consolidated information item is greater than a first threshold, includes, in an entry: information contents corresponding to the second consolidated information item, the determined number of first consolidated information items that are consolidated by the second consolidated information item, and the latest receiving time of second consolidated information items in the third target encrypted information block.

In order to ensure the accuracy of the mined information templates, for any third target encrypted information block, the server may preset a first threshold number of first consolidated information items consolidated by a second consolidated information item in the third target encrypted information block, which may be 10, 20, 30, or the like, to use to mine information templates from third target encrypted information block on the basis of a frequent sequence mining method. During this process, the server may compare with the territory threshold the number of the encrypted information items that have been consolidated by any second consolidated information item that is in the third target encrypted information block. Then, if the number of the encrypted information items consolidated by the second consolidated information item is greater than the first threshold, the server may form one entry by including in the entry the information contents corresponding to the second consolidated information item, the number of encrypted information items that have been consolidated by the second consolidated information item, and the latest receiving time of the third target encrypted information block. The formed entry may be represented by <pat, c2, latestDatetime2>, wherein pat refers to the information contents, c2 refers to the number of information items consolidated by the second consolidated information item, and latestDatetime2 refers to the latest receiving time of the second consolidated information in the third target encrypted information block.

In step 203-3-3, the server consolidates a plurality of entries included in the third target encrypted information block to create an information template, each of the plurality of entries having same information contents as each other of the plurality of entries, wherein a number of encrypted information items that are applicable to the created information template is a sum of respective numbers of encrypted information items that are consolidated by each of the plurality of entries, and the receiving time of the created information template is the latest receiving time of the plurality of entries.

The server consolidates a plurality of entries in the third target encrypted information block that have the same information contents as each other, to create one information template representative of that plurality of entries. The number of encrypted information items to which the information template is applicable may be the sum of the number of encrypted information items that have been consolidated by the plurality of entries, and the receiving time of the information template may be the latest receiving time of the plurality of entries. Encrypted information from a message may be applicable to an information template when the message's non-encrypted information is at least substantially the same as the non-encrypted information from other messages from which the information template was extracted. The number of encrypted information items to which an information template is applicable may thus represent the number of messages from which information has passed through the consolidation steps to create that information template. The number of encrypted information items to which an information template is applicable may be stored in association with the information template.

The foregoing is explained by reference to clustering a third target encrypted information block to create one information template. The process of clustering other third target encrypted information blocks to create information templates may be implemented with reference to the foregoing step 203-3, and will not be further elaborated herein.

It may be seen from the foregoing steps 201 to 203 that a process of mining information templates in embodiments of the present disclosure is substantively a process of abstracting information content that is common to a plurality of information items and shielding private information items contained therein, such as names of peoples, names of places, or the like, as well as such numerical information such as bank card numbers, mobile phone numbers, or the like. For example, applying a method provided by embodiments of the present disclosure to short message 1, short message 2, and short message 3 from the foregoing step 202-4 may create the following information template:

[Bank] Dear Mr/Miss <*>, you have changed your original mobile phone number (tail number <Number>) into mobile phone number (tail number <Number>) on <Time>, please use the new mobile phone number to transact e-banking business, and please call <PhoneNumber> in case of any query.

In step 204, the server verifies a coverage rate of the at least one information template.

Generally, the foregoing process of mining the information template can completely shield private information of users in the template. However, to prevent a program error leading to incomplete shielding of private information of a user in a resulting information template, a method provided by an embodiment may also verify the coverage rate of every mined information template. Verifying the coverage rate may refer to calculating the coverage ratio of the information template for the test information set, i.e., the ratio of the number of matched information items to all the information items.

With regard to the triad <pat, c2, latestDatetime2> generally representative of each information template, if a theoretical minimum coverage rate of an information template for the information items to be processed that are included in the corresponding corpus2 (placei) is c, and a number of information items to be processed that are included in corpus2 (placei) is N, then the coverage rate of information contents pat in corpus2 (placei) is rate=c/N.

Often, the expected value of the coverage rate of the mined information template for information contents pat in other information sets should also be rate, and the expected value will generally have a fluctuation of ε. That is, the expected value of the coverage rate of the information template for information contents pat in other information sets should be between [rate-ε, rate+ε]. For the information contents pat having a coverage rate between [0, rate-ε], the information contents pat may be deleted from the corresponding mined information template because the coverage rate is relatively small. A coverage number threshold m may be given, and the information contents pat having a coverage number less than m may also be deleted from the corresponding mined information template, so that the coverage rate of the actual information template is between [rate-ε, 1] and has a certain absolute coverage number.

The process of mining an information template may be a process of deriving an information template from information items to be processed, while the process of verifying a coverage rate may be the process of using the template to match the test information items against the mined template. The two are complementary processes, which can ensure that a mined information template does not include the private information of a user from positive and negative aspects. There may be no intersection between an information set used in the process of verifying a coverage rate and an information set used in the process of mining the template, and both may be randomly extracted from the original information set. That the two different types of information sets have similar distributions further may further ensure that the mined information template does not include the private information of the user.

Exemplarily, the following steps 204-1-204-3 may be employed while the server verifies the coverage rate of each information template.

In step 204-1, the server forms a test information set, the test information set comprising a plurality of test information items.

In order to improve the accuracy of the verification result, the server may acquire, from the plurality of information items to be processed, a second predetermined number of the plurality of information items to be processed. The second predetermined number of the plurality of information items to be processed may have a same sender identify as the first predetermined number of the plurality of information items to be processed. The second predetermined number of the plurality of information items to be processed may be information items that were not included as modeling information items in the modeling information set. The second preset number may be 100, 200 or 300, or the like, and the second preset number is not limited by these exemplary embodiments.

In step 204-2, the server processes the plurality of test information items to form a plurality of first test information blocks.

The following steps 204-2-1-204-2-3 may be employed when the server respectively processes the plurality of test information items to form the plurality of first test information blocks.

In step 204-2-1, the server processes test information items of the plurality of test information items to form a plurality of first test information blocks.

The following steps 204-2-1-1-204-2-1-3 may be employed when the server encrypts the plurality of test information items to create the plurality of encrypted test information items.

In step 204-2-1-1, the server, for a test information item of the plurality of test information items, determines a respective territory identity of the test information item according to a respective receiver identity of the test information item.

Often, different service providers use different information templates in different locations or regions according to different region features. Because respective receiver identities may indicate the respective locations or regions of different users, the server may determine the territory identity of the test information based on the receiver identity of the test information. In a present embodiment, a territory identity may be generally represented by place, and respective corresponding values of territory identities (place) may be different when the respective territory locations are different. For instance, the territory identity of Beijing may be "beijing", and the territory identity of Shanghai may be "shanghai" or the like.

In step 204-2-1-2, the server encrypts the respective receiver identity of the test information item to generate a respective first feature code of the test information item.

To encrypt the receiver identity of the test information item, the server may employ a preset encryption algorithm, the preset encryption algorithm being determined by the server. A cipher text corresponding to the receiver identity of the test information item may be generated by encrypting the receiver identity of the test information item using the preset encryption algorithm. The cipher text may also be called the first feature code. In a present embodiment, a first feature code may also be generally represented by ciphertext, with different receiver identities having different respective ciphertext. For instance, the ciphertext of a receiver identity 123456 may be a, and the ciphertext of a receiver identity 258369 may be c, or the like.

The respective first feature codes generated by encrypting different receiver identities using the preset encryption algorithm may be different, such that the respective first feature code corresponding to each receiver identity is unique. In other words, a respective receiver identity and the corresponding respective first feature code may be in one to one correspondence, and each receiver identity may have only one corresponding respective first feature code, and vice versa.

In step 204-2-1-3, the server includes in a respective encrypted test information item: the respective territory identity of the test information item, the respective first feature code of the test information item, and respective information contents of the test information item.

The server forms a respective encrypted test information item for a given test information item by including in the encrypted test information item the respective territory identity of the test information item, the respective first feature code of the test information item, and the information contents of the respective test information item. In a present embodiment, the information contents of a test information item may be represented by content. Encrypted test information may be a triad of information that can be represented by <place, ciphertext, content>. Information contents may for example include the text of a message that is not encrypted and represented by a cipher text.

The foregoing process of encrypting a test information item in the test information set is provided as an example, and may in practice be applied identically to the process of encrypting any other test information item. The foregoing process of encrypting the test information item may be referenced for implementation details, and the process will not be further elaborated herein.

In step 204-2-2, the server encrypts test information items of the plurality of encrypted test information items that have same respective third consolidation conditions, to create a plurality of third consolidated information items.

In a specific implementation, the following steps 204-2-2-1-204-2-2-3 may be employed by the server to consolidate the plurality of encrypted test information items to create the plurality of third consolidated information items.

In step 204-2-2-1, the server forms a plurality of second test information blocks from the plurality of encrypted test information items, such that each of the plurality of encrypted test information items included in a second test information block of the plurality of second test information blocks has a same territory identity and same information contents as each other of the plurality of encrypted test information items included in the second test information block.

Because each encrypted test information item may be represented as the triad of information including the respective territory identity, the respective first feature code, and the information contents of the test information item, the server may acquire encrypted test information items each having the same respective territory identity and information contents as each other, and form a respective second test information block that is an encrypted information block that includes the acquired encrypted test information items that have the same territory identity and information contents as each other.

For example, the server may create a plurality of encrypted test information items, wherein encrypted test information item 1 is <beijing, a, content 1>, encrypted test information 2 is <beijing, b, content 1>, encrypted test information item 3 is <beijing, c, content 1>, encrypted test information 4 is <tianjin, d, content 2>, and encrypted test information item 5 is <tianjin, c, content 2>. The server may then form one second test information block that includes encrypted test information item 1, encrypted test information item 2, and encrypted test information item 3, because each of those encrypted test information items has the same respective territory identity of beijing and the same respective information contents of content 1. The server may also form another second test information block that includes encrypted information item 4 and encrypted information item 5, because each has the same respective territory identity of tianjin and the same respective information contents of content 2.

In step 204-2-2-2, the server, for a second test information block of the plurality of second test information blocks, determines a respective number of encrypted test information items included in the second test information block.

A number of encrypted test information items in a second test information block may be 2, 3 or the like, and the number of encrypted test information items in a second test information block is not limited by these exemplary embodiments. In a present embodiment, a number of the encrypted test information in a second test information block may generally be represented by c3.

In step 204-2-2-3, the server includes, in a respective third consolidated information item: a respective territory identity of the second test information block, the respective determined number of encrypted test information items included in the second test information block, and respective information contents of the second test information block.

Each third consolidated information item may be a triad of information that may be represented by <place, c3, content>. A third consolidated information item may be representative of encrypted test information items that it consolidates.

The foregoing has been explained by showing consolidation of the encrypted test information items in a given second test information block. The process of consolidating encrypted test information items in any other second test information blocks may be implemented with reference to the foregoing process, and will not be further elaborated herein.

In order to facilitate managing the third consolidated test information items, the server may also form the plurality of consolidated test information items into a set corpus3.

In step 204-2-3, the server divides the plurality of third consolidated information items into a plurality of first test information blocks, such that each of the plurality of third consolidated information items included in a first test information block of the plurality of test information blocks has a same territory identity as each other third consolidated information item included in the first test information block.

Often, the respective information contents of information items sent by the service providers to users are different according to different territory features, and information templates that can be verified by the server based on information items with different respective information contents will be different. Therefore, in order to conduct a targeted information template validation, the server may divide the plurality of third consolidated information items into a plurality of respective first test information blocks, such that each third consolidated information item in a respective first test information block has the same territory identity as each other third consolidated information item in the respective first test information block. In an implementation, the server may divide the set corpus3 into n disjoint subsets according to the territory identity of the second consolidated information items that are included in corpus3. For example, subsets may include validate corpus3 (place1), validate corpus3 (place2), validate corpus3 (place3), . . . , and validate corpus3 (placen). With regard to any subset validate corpus3 (placei), the respective territory identity corresponding to each third consolidated information item that is included in the subset validate corpus3 (placei) is placei, and each third consolidated information item that is included in the subset validate corpus3 (placei) is a triad of information that may be generally represented by <place, c4, content>, where, c4 is a number of third consolidated information items that are included in a respective first test information block.

In step 204-3, the server verifies a coverage rate for the at least one information template based on the plurality of first test information blocks.

The following steps 204-3-1-204-3-2 may be employed when the server verifies the coverage rate for one or more information templates based on the plurality of first test information blocks.

In step 204-3-1, the server determines a respective number of test information items included in a first test information block of the plurality of first information blocks that have information contents that match with information contents of the at least one information template.

Taking any given mined information template as an example, the server may also determine whether a match exists between the information template and each first test information block of the plurality of first test information blocks. During matching, the server may determine whether a match exists between template information contents of the information template and the respective information contents of each third consolidated information item that is included in each first test information block. For example, the server may compare the respective information contents of a third consolidated information item with the template information contents of the information template. An information template may be determined to match with a third consolidated information item in a first test information block when the comparison shows that the template information content of the information template is identical to information content of a third consolidated information item that is included in a first test information block, or that a similarity between the template information content and the information content of the third consolidated information is greater than a specific value. The number of test information items of each first test information block of the plurality of first test information blocks that match with the information template may be determined through matching by using this manner.

With regard to the foregoing process, in order to facilitate understanding, a detailed explanation and illustration is provided hereinafter which considers an exemplary determination of whether matching exists between an exemplary information template and an exemplary first test information block.

The exemplary mined information template is "[Bank] Dear Mr/Miss <*>, you have changed your mobile phone number (tail number <Number>) into mobile phone number (tail number <Number>) on <Time>, please use the new mobile phone number to transact e-banking business, and please call <PhoneNumber> in case of any query." The exemplary test information included in the exemplary first test information block is a short message 1, a short message 2, a short message 3, a short message 4, and a short message 5. Short message 1 is "[Bank] Dear Mr/Miss Fei LIU, you have changed your original mobile phone number (tail number 0102) into mobile phone number (tail number 0988) on Aug. 21, 2014, please use the new mobile phone number to transact e-banking business, and please call 95580 in case of any query."; short message 2 is "[Bank] Dear Mr/Miss Jie ZHZANG you have changed your original mobile phone number (tail number 0209) into mobile phone number (tail number 8988) on Jul. 13, 2014, please use the new mobile phone number to transact e-banking business, and please call 95580 in case of any query."; short message 3 is "[Bank] Dear Mr/Miss Changjiang WANG you have changed your original mobile phone number (tail number 0109) into mobile phone number (tail number 1234) on Aug. 7, 2014, please use the new mobile phone number to transact e-banking business, and please call 95580 in case of any query."; short message 4 is "Dear customer, you can avoid inputting ID card number or card No. by calling using the mobile phone 186 (tail number 1234) obligated in the system to prevent tedious operation and enjoy simple life."; and short message 5 is "Dear customer, your order bill 10142389122 has been delivered and is on the way of shipping, please wait patiently. Our shopping mall will not initiatively ask you to provide your bank card information to operate for refunding by the reason of invalid order bill, please beware of fraud!". When the server determines whether the information template respectively matches with each of the five short messages in the first test information block, it may find that short message 1, short message 2, and short message 3 match with the information template, while short message 4 and short message 5 do not match with the information template.

In step 204-3-2, when the respective determined number of test information items included in the first test information block that have information contents that match with the information contents of the at least one information template is greater than a second threshold, determining a ratio between (i) the respective determined number of test information items included in the first test information block that have information contents that match with the information contents of the at least one information template and (ii) a respective number of test information items included in the first test information block.

A second threshold may be 3, 5, 8, or the like, and the second threshold is not limited to these exemplary embodiments. When the number of the test information items of a first test information block that have information contents that match information contents of the information template is greater than the second threshold, the server will also determine the ratio of the respective determined number of test information items included in the first test information block that have information contents that match with the information contents of the at least one information template to a respective number of test information items included in the first test information block. For example, if the number of the test information items of a first test information block that match the information template is t, and the total number of test information items included in the first test information block is o, then it may be determined that the ratio of the number of the matched test information items that are included in the first test information block to the total number of test information items that are included in the first test information block equals t/o.

For example, when comparing the information template with a first test information block, the server may determine that the number of the test information items of the first test information block that match with the information template is 100. If the second threshold is set to be 120, then the server may determine that the ratio of the number of the test information items that match the template to the total number of test information items included in the first test information block is 100/120=83.3%.

In step 205, the server determines whether to set the at least one information template as an actual information template based on the result of the verifying of the coverage rate.

When a method according to the foregoing step 204 is employed to verify a mined information template, if the ratio of the number of matched test information items in the first test information block to the total number of test information items included in the first test information block is within a preset range, this information template may be set to be the actual information template. An exemplary preset range may be [50%, 100%], [70%, 100%] or the like, and the preset range is not limited to these exemplary embodiments.

Moreover, in order to ensure 100% shielding of private information of the user, after verifying the coverage rate of the information template, the server may also provide the verified actual information template to an auditing staff for manual auditing, and only after the information template passes the auditing will the server provide the information template to relevant technicians for use.

According to a method provided by embodiments of the present disclosure, an information template is mined through analysis of a plurality of modeling information items, and numerical information items included in the modeling information item are encrypted during the template mining process, which prevents a user's private information from being disclosed in the mined template, so that a more secure method for mining an information template may be provided.

Figure 3:
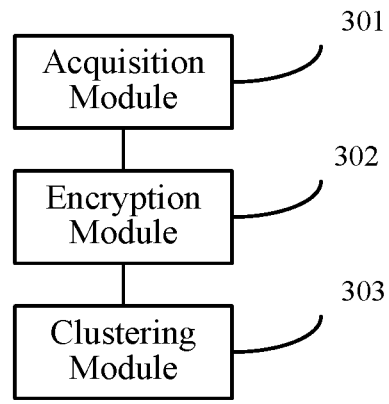
FIG. 3 is a block diagram illustrating a device for mining an information template, according to an exemplary embodiment.

FIG. 3 is a structure diagram illustrating a device for mining an information template, according to an exemplary embodiment. Referring to FIG. 3, a device includes an acquisition module 301, an encryption module 302 and a clustering module 303.

The acquisition module 301 is configured to form a modeling information set, the modeling information set including a plurality of modeling information items.

The encryption module 302 is configured to create a plurality of encrypted information items, wherein creating the plurality of encrypted information items comprises encrypting respective numerical information items included in modeling information items of the plurality of modeling information items.

The clustering module 303 is configured to cluster the plurality of encrypted information items to create at least one information template.

In an embodiment of the present disclosure, the acquisition module 301 is configured to acquire a plurality of information items to be processed, each of the plurality of information items to be processed comprising a respective sender identity. The acquisition module 301 may be further configured to divide the plurality of information items to be processed into different information sets, such that each of the plurality of information items to be processed included in an information set of the different information sets has a same sender identity as each other of the plurality of information items to be processed included in the information set. The acquisition module 301 may be further configured to acquire from an information set of the different information sets, a first predetermined number of the plurality of information items to be processed. The acquisition module 301 may be further configured to include, as modeling information items in the modeling information set, the first predetermined number of the plurality of information items to be processed.

In an embodiment of the present disclosure, the encryption module 302 is configured to, for a modeling information item of the plurality of modeling information items, determine a respective territory identity of the modeling information item according to a respective receiver identity of the modeling information item. The encryption module 302 may be further configured to encrypt the respective receiver identity of the modeling information item, to generate a respective first feature code of the modeling information item. The encryption module 302 may be further configured to encrypt a respective numerical information item in the modeling information item according to a type of the respective numerical information item in the modeling information item, to generate a respective second feature code of the modeling information item. The encryption module 302 may be further configured to include, in a respective encrypted information item: the respective territory identity, the respective first feature code, the respective second feature code, and a respective receiving time of the modeling information item.

In an embodiment of the present disclosure, the clustering module 303 is configured to consolidate encrypted information items of the plurality of encrypted information items that have same respective first consolidation conditions, to create a plurality of first consolidated information items. The clustering module 303 may be further configured to consolidate encrypted information items that are included in the plurality of first consolidated information items and that have same respective second consolidation conditions, to create a plurality of second consolidated information items. The clustering module 303 may be further configured to cluster the plurality of second consolidated information items to create the at least one information template.

In an embodiment of the present disclosure, the clustering module 303 is configured to form a plurality of first target encrypted information blocks from the plurality of encrypted information items, such that each of the plurality of encrypted information items included in a first target encrypted information block of the plurality of first target encrypted information blocks has a same territory identity, a same first feature code, and a same second feature code as each other of the plurality of encrypted information items included in the first target encrypted information block. The clustering module 303 may be further configured to, for a first target encrypted information block of the plurality of first target encrypted information blocks, sort encrypted information items in the first target encrypted information block according to receiving times of each of the encrypted information items in the first target encrypted information block, from most recent to least recent. The clustering module 303 may be further configured to save an encrypted information item in the respective first target encrypted information block having a latest receiving time and delete each other encrypted information item in the first target encrypted information block, to create a respective first consolidated information item.

In an embodiment of the present disclosure, the clustering module 303 is configured to form a plurality of second target encrypted information blocks from the plurality of first consolidated information items, such that each of the plurality of first consolidated information items included in a second target encrypted information block of the plurality of second target encrypted information blocks has a same territory identity and a same second feature code as each other of the plurality of first consolidated information items included in the second target encrypted information block. The clustering module 303 may be further configured to, for a second target encrypted information block of the plurality of second target encrypted information blocks, determine a respective number of first consolidated information items included in the second target encrypted information block. The clustering module 303 may be further configured to determine a respective latest receiving time of the first consolidated information items in the second target encrypted information block. The clustering module 303 may be further configured to include, in a respective second consolidated information item: a respective territory identity of the second target encrypted information block, the respective determined number of items of first consolidated information included in the second target encrypted information block, a respective second feature code of the second target encrypted information block, and the respective latest receiving time of items of first consolidated information in the second target encrypted information block.

In an embodiment of the present disclosure, the clustering module 303 is configured to divide the plurality of second consolidated information items into a plurality of third target encrypted information blocks, such that each of the plurality of second consolidated information items included in a third target encrypted information block of the plurality of third target encrypted information blocks has a same territory identity as each other of the plurality of second consolidated information items included in the third target encrypted information block. The clustering module 303 may be further configured to determine a number of first consolidated information items that are consolidated by a second consolidated information item in a third target encrypted information block of the plurality of third target encrypted information blocks. The clustering module 303 may be further configured to when the determined number of first consolidated information items that are consolidated by the second consolidated information item is greater than a first threshold, include, in an entry: information contents corresponding to the second consolidated information item, the determined number of first consolidated information items that are consolidated by the second consolidated information item, and the latest receiving time of second consolidated information items in the third target encrypted information block. The clustering module 303 may be further configured to consolidate a plurality of entries included in the third target encrypted information block to create an information template, each of the plurality of entries having same information contents as each other of the plurality of entries, wherein a number of encrypted information items that are applicable to the created information template is a sum of respective numbers of encrypted information items that are consolidated by each of the plurality of entries, and the receiving time of the created information template is the latest receiving time of the plurality of entries.

In an embodiment of the present disclosure, the device may further include a verification module and a determination module.

The verification module is configured to verify the coverage rate for each information template.

The determination module is configured to determine whether to set the at least one information template as an actual information template based on a result of the verifying of the coverage rate.

In an embodiment of the present disclosure, the verification module is configured to form a test information set, the test information set comprising a plurality of test information items. The verification module may be further configured to processing test information items of the plurality of test information items to form a plurality of first test information blocks. The verification module may be further configured to a coverage rate for the at least one information template based on the plurality of first test information blocks.

In an embodiment of the present disclosure, the verification module is configured to form the test information set by forming, from the plurality of information items to be processed, a second predetermined number of the plurality of information items to be processed, the second predetermined number of the plurality of information items to be processed having a same sender identify as the first predetermined number of the plurality of information items to be processed, and the second predetermined number of the plurality of information items to be processed not included as modeling information items in the modeling information set.

In an embodiment of the present disclosure, the verification module is configured to encrypt the plurality of test information items to create a plurality of encrypted test information items. The verification module may be further configured to consolidate encrypted test information items of the plurality of encrypted test information items that have same respective third consolidation conditions, to create a plurality of third consolidated information items. The verification module may be further configured to divide the plurality of third consolidated information items into a plurality of first test information blocks, such that each of the plurality of third consolidated information items included in a first test information block of the plurality of test information blocks has a same territory identity as each other third consolidated information item included in the first test information block.

In an embodiment of the present disclosure, the verification module is configured to, for a test information item of the plurality of test information items, determine a respective territory identity of the test information item according to a respective receiver identity of the test information item. The verification module may be further configured to the respective receiver identity of the test information item to generate a respective first feature code of the test information item. The verification module may be further configured to include in a respective encrypted test information item: the respective territory identity of the test information item, the respective first feature code of the test information item, and respective information contents of the test information item.

In an embodiment of the present disclosure, the verification module is configured to form a plurality of second test information blocks from the plurality of encrypted test information items, such that each of the plurality of encrypted test information items included in a second test information block of the plurality of second test information blocks has a same territory identity and same information contents as each other of the plurality of encrypted test information items included in the second test information block. The verification module may be further configured to, for a second test information block of the plurality of second test information blocks, determine a respective number of encrypted test information items included in the second test information block. The verification module may be further configured to include, in a respective third consolidated information item: a respective territory identity of the second test information block, the respective determined number of encrypted test information items included in the second test information block, and respective information contents of the second test information block.

In an embodiment of the present disclosure, the verification module is configured to determine a respective number of test information items included in a first test information block of the plurality of first information blocks that have information contents that match with information contents of the at least one information template. The verification module may be further configured to, when the respective determined number of test information items included in the first test information block that have information contents that match with the information contents of the at least one information template is greater than a second threshold, determine a ratio between (i) the respective determined number of test information items included in the first test information block that have information contents that match with the information contents of the at least one information template and (ii) a respective number of test information items included in the first test information block.

In an embodiment of the present disclosure, the determination module is configured to, when the determined ratio is within a preset range, set the at least one information template to be the actual information template.

According to devices provided by embodiments of the present disclosure, the information template is mined through analysis of a plurality of modeling information items, and numerical information items included in the modeling information items are encrypted during the template mining process, which prevents users' private information from being disclosed by the mined template, so that a more secure method for mining an information template may be provided.

With respect to devices in the above embodiments, the specific manners for performing operations of individual modules have been described in detail in the embodiments regarding the methods, which will not be further elaborated herein.

Figure 4:
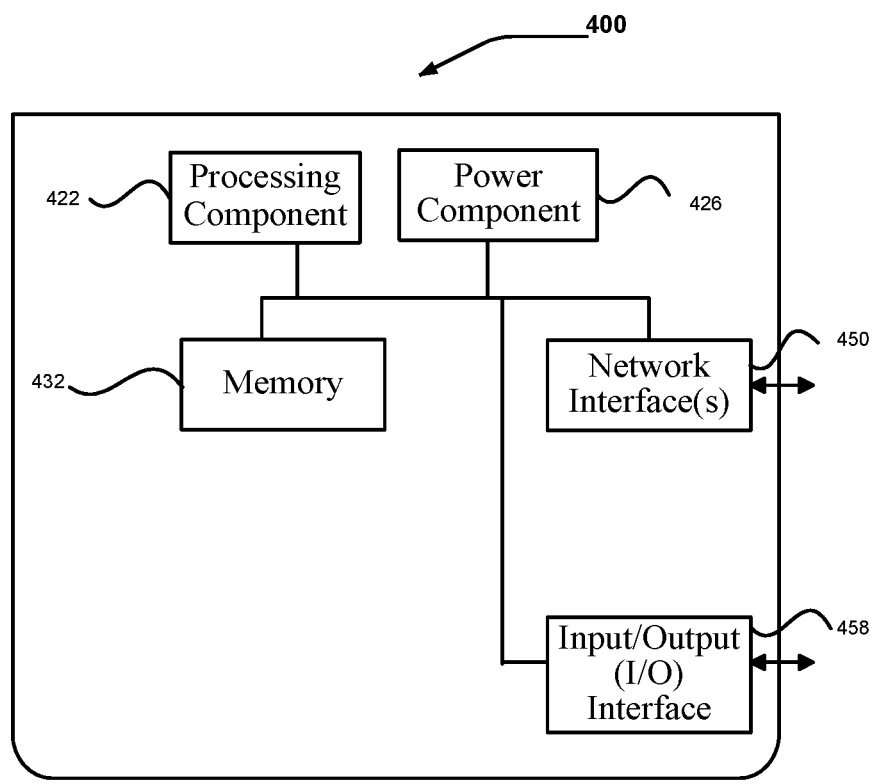
FIG. 4 is a block diagram illustrating a device for mining an information template, according to an exemplary embodiment.

FIG. 4 is a block diagram illustrating a device 400 for mining an information template, according to an exemplary embodiment. For example, the device 400 may be provided as a server. Referring to FIG. 4, the device 400 includes a processing component 422 that further includes one or more processors, and memory resources represented by a memory 432 for storing instructions executable by the processing component 422, such as application programs. The application programs stored in the memory 432 may include one or more modules each corresponding to a set of instructions. Further, the processing component 422 is configured to execute the instructions to perform the above method for mining an information template.

For example, memory 432 may store as processor executable instructions any or all of the modules described herein, including acquisition module 301, encryption module 302, clustering module 303, the verification module, and the determination module, which may be executed by processing component 422 to perform the operations associated with those modules as described above in connection with those modules and their corresponding method steps. Similarly, processing component 422 may be configured to perform any or all of the method steps, sub-steps, etc., described herein, including step 101, step 102, step 103, step 201, step 201-1, step 201-2, step 201-3, step 201-4, step 202, step 202-1, step 202-2, step 202-3, step 202-4, step 203, step 203-1, step 203-1-1, step 203-1-2, step 203-1-3, step 203-2, step 203-2-1, step 203-2-2, step 203-2-3, step 203-3, step 203-3-1, step 203-3-2, step 203-3-3, step 204, step 204-1, step 204-2, step 204-2-1, step 204-2-1-1, step 204-2-1-2, step 204-2-1-3, step 204-2-2, step 204-2-2-1, step 204-2-2-2, step 204-2-2-3, step 204-2-3, step 204-3, step 204-3-1, or step 204-3-2.

The device 400 may also include a power component 426 configured to perform power management of the device 400, wired or wireless network interface(s) 450 configured to connect the device 400 to a network, and an input/output (I/O) interface 458. The device 400 may operate based on an operating system stored in the memory 432, such as Windows Server™, Mac OS X™, Unix™, Linux™, FreeBSD™, or the like.

The methods, devices, and modules described above may be implemented in many different ways and as hardware, software or in different combinations of hardware and software. For example, all or parts of the implementations may be a processing circuitry that includes an instruction processor, such as a central processing unit (CPU), microprocessor, a microprocessor; or application specific integrated circuits (ASICs), digital signal processors (DSPs), digital signal processing devices (DSPDs), programmable logic devices (PLDs), field programmable gate arrays (FPGAs), controllers, micro-controllers, microprocessors, other electronic components; or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Each module discussed above, such as the acquisition module 301, encryption module 302, clustering module 303, the verification module, and the determination module, may take the form of a packaged functional hardware unit designed for use with other components, a portion of a program code (e.g., software or firmware) executable by the processor of processing component 422 or the processing circuitry that usually performs a particular function of related functions, or a self-contained hardware or software component that interfaces with a larger system, for example.

According to devices provided by embodiments of the present disclosure, the information template is mined through analysis of a plurality of modeling information items, and the numerical information items included in the modeling information items are encrypted during the template mining process, which prevents users' private information from being disclosed by the mined template, so that a more secure method for mining an information template is provided.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for mining an information template, comprising:
    forming, by a processor, a modeling information set comprising a plurality of modeling information items;
    creating, by the processor, a plurality of encrypted information items by encrypting respective numerical information items included in the plurality of modeling information items, wherein creating the plurality of encrypted information items comprises:
        for a given modeling information item of the plurality of modeling information items:
            encrypting a respective receiver identity of the modeling information item and thereby generating a respective first feature code of the modeling information item, and
            including, in a respective encrypted information item, the respective first feature code and a respective receiving time of the modeling information item; and
    clustering, by the processor, the plurality of encrypted information items and thereby creating at least one information template, wherein clustering the plurality of encrypted information items comprises creating a plurality of first consolidated information items, and wherein creating the plurality of first consolidated information items comprises:
        forming a plurality of first target encrypted information blocks from the plurality of encrypted information items, such that each of the plurality of encrypted information items included in a first target encrypted information block has a same respective first feature code as each other of the plurality of encrypted information items included in the first target encrypted information block, and
        for a given first target encrypted information block of the plurality of first target encrypted blocks, saving an encrypted information item in the respective first target encrypted information block having a most recent respective receiving time and deleting each other encrypted information item in the respective first target encrypted information block, and thereby creating a respective first consolidated information item.

2. The method according to claim 1, wherein forming the modeling information set comprises:
    acquiring a plurality of information items to be processed, each of the plurality of information items to be processed comprising a respective sender identity;
    dividing the plurality of information items to be processed into different information sets, such that each of the plurality of information items included in an information set has a same sender identity as each other of the plurality of information items included in the information set;
    acquiring, from an information set, a first predetermined number of information items to be processed; and
        including, as modeling information items in the modeling information set, the first predetermined number of information items to be processed.

3. The method according to claim 1, wherein creating the plurality of encrypted information items further comprises:
    for a given modeling information item:
        determining a respective territory identity of the modeling information item according to the respective receiver identity of the modeling information item,
        encrypting a respective numerical information item in the modeling information item according to a type of the respective numerical information item in the modeling information item and thereby generating a respective second feature code of the modeling information item, and
        further including, in the respective encrypted information item: the respective territory identity and the respective second feature code.

4. The method according to claim 1, wherein clustering the plurality of encrypted information items further comprises:
    consolidating encrypted information items that are included in the plurality of first consolidated information items and that have same respective second consolidation conditions, and thereby creating a plurality of second consolidated information items; and
    clustering the plurality of second consolidated information items to create the at least one information template.

5. The method according to claim 4, wherein creating the plurality of first consolidated information items further comprises:
    forming the plurality of first target encrypted information blocks from the plurality of encrypted information items, such that each of the plurality of encrypted information items included in a first target encrypted information block further has a same territory identity and a same second feature code as each other of the plurality of encrypted information items included in the first target encrypted information block; and
    for a given first target encrypted information block:
        sorting encrypted information items in the first target encrypted information block according to receiving times of each of the encrypted information items in the first target encrypted information block, from most recent to least recent.

6. The method according to claim 4, wherein consolidating the encrypted information items that are included in the plurality of first consolidated information items and that have the same respective second consolidation conditions and thereby creating the plurality of second consolidated information items comprises:
    forming a plurality of second target encrypted information blocks from the plurality of first consolidated information items, such that each of the plurality of first consolidated information items included in a second target encrypted information block has a same territory identity and a same second feature code as each other of the plurality of first consolidated information items included in the second target encrypted information block; and for a given second target encrypted information block:
determining a respective number of first consolidated information items included in the second target encrypted information block,
determining a respective most recent receiving time of the first consolidated information items in the second target encrypted information block, and
including, in a respective second consolidated information item: a respective territory identity of the second target encrypted information block, the respective determined number of items of first consolidated information included in the second target encrypted information block, a respective second feature code of the second target encrypted information block, and the respective most recent receiving time of items of first consolidated information in the second target encrypted information block.

7. The method according to claim 4, wherein clustering the plurality of second consolidated information items to create the at least one information template comprises:
dividing the plurality of second consolidated information items into a plurality of third target encrypted information blocks, such that each of the plurality of second consolidated information items included in a third target encrypted information block has a same territory identity as each other of the plurality of second consolidated information items included in the third target encrypted information block;
determining a number of first consolidated information items that are consolidated by a second consolidated information item in a third target encrypted information block;
when the determined number of first consolidated information items that are consolidated by the second consolidated information item is greater than a first threshold, including, in an entry: information contents corresponding to the second consolidated information item, the determined number of first consolidated information items that are consolidated by the second consolidated information item, and the most recent receiving time of second consolidated information items in the third target encrypted information block; and
consolidating a plurality of entries included in the third target encrypted information block to create the at least one information template, each of the plurality of entries having same information contents as each other of the plurality of entries, wherein a number of encrypted information items that are applicable to the created information template is a sum of respective numbers of encrypted information items that are consolidated by each of the plurality of entries, and the receiving time of the created at least one information template is the most recent receiving time of the plurality of entries.

8. The method according to claim 2, wherein the method further comprises, after clustering the plurality of encrypted information items and thereby creating the at least one information template:
verifying a coverage rate for the at least one information template; and determining whether to set the at least one information template as an actual information template based on a result of the verifying of the coverage rate.

9. The method according to claim 8, wherein verifying the coverage rate for the at least one information template comprises:
forming a test information set, the test information set comprising a plurality of test information items;
processing the plurality of test information items to form a plurality of first test information blocks; and
verifying a coverage rate for the at least one information template based on the plurality of first test information blocks.

10. The method according to claim 9, wherein forming the test information set comprises acquiring, from the plurality of information items to be processed, a second predetermined number of information items to be processed, the second predetermined number of information items to be processed having a same sender identify as the first predetermined number of information items to be processed, and the second predetermined number of information items to be processed not included as modeling information items in the modeling information set.

11. The method according to claim 9, wherein processing the plurality of test information items to form the plurality of first test information blocks comprises:
encrypting the plurality of test information items to create a plurality of encrypted test information items;
consolidating encrypted test information items that have same respective third consolidation conditions, to create a plurality of third consolidated information items; and
dividing the plurality of third consolidated information items into a plurality of first test information blocks, such that each of the plurality of third consolidated information items included in a first test information block has a same territory identity as each other third consolidated information item included in the first test information block.

12. The method according to claim 11, wherein encrypting the plurality of test information items to create the plurality of encrypted test information items comprises:
for a given test information item:
determining a respective territory identity of the test information item according to a respective receiver identity of the test information item;
encrypting the respective receiver identity of the test information item to generate a respective first feature code of the test information item; and
including, in a respective encrypted test information item: the respective territory identity of the test information item, the respective first feature code of the test information item, and respective information contents of the test information item.

13. The method according to claim 11, wherein consolidating the encrypted test information items that have the same respective third consolidation conditions, to create a plurality of third consolidated information items, comprises:
forming a plurality of second test information blocks from the plurality of encrypted test information items, such that each of the plurality of encrypted test information items included in a second test information block has a same territory identity and same information contents as each other of the plurality of encrypted test information items included in the second test information block; and for a given second test information block:
  determining a respective number of encrypted test information items included in the second test information block, and
  including, in a respective third consolidated information item: a respective territory identity of the second test information block, the respective determined number of encrypted test information items included in the second test information block, and respective information contents of the second test information block.

14. The method according to claim 9, wherein verifying the coverage rate for the at least one information template based on the plurality of first test information blocks comprises:
  determining a respective number of test information items included in a first test information block that have information contents that match with information contents of the at least one information template; and
  when the respective determined number of test information items included in the first test information block that have information contents that match with the information contents of the at least one information template is greater than a second threshold, determining a ratio between (i) the respective determined number of test information items included in the first test information block that have information contents that match with the information contents of the at least one information template and (ii) a respective number of test information items included in the first test information block.

15. The method according to claim 14, wherein determining whether to set the at least one information template as the actual information template based on the result of the verifying of the coverage rate comprises:
  when the determined ratio is within a preset range, setting the at least one information template to be the actual information template.

16. A device for mining an information template, comprising:
  a processor; and
  a memory for storing instructions executable by the processor;
  wherein the processor is configured to:
    form a modeling information set comprising a plurality of modeling information items;
    create a plurality of encrypted information items by encrypting respective numerical information items included in the plurality of modeling information items, wherein to create the plurality of encrypted information items, the processor is configured to:
      for a given modeling information item of the plurality of modeling information items:
        encrypt a respective receiver identity of the modeling information item and thereby generate a respective first feature code of the modeling information item, and
        include, in a respective encrypted information item, the respective first feature code and a respective receiving time of the modeling information item; and
    cluster the plurality of encrypted information items and thereby create at least one information template, wherein to cluster the plurality of encrypted information items, the processor is configured to create a plurality of first consolidated information items, and wherein to create the plurality of first consolidated information items, the processor is configured to:
  form a plurality of first target encrypted information blocks from the plurality of encrypted information items, such that each of the plurality of encrypted information items included in a first target encrypted information block has a same respective first feature code as each other of the plurality of encrypted information items included in the first target encrypted information block, and
  for a given first target encrypted information block of the plurality of first target encrypted blocks:
    save an encrypted information item in the respective first target encrypted information block having a most recent respective receiving time and delete each other encrypted information item in the respective first target encrypted information block, and thereby create a respective first consolidated information item.

17. The device according to claim 16, wherein the processor is further configured to:
  acquire a plurality of information items to be processed, each of the plurality of information items to be processed comprising a respective sender identity;
  divide the plurality of information items to be processed into different information sets, such that each of the plurality of information items included in an information set has a same sender identity as each other of the plurality of information items included in the information set;
  acquire, from an information set, a first predetermined number of information items to be processed; and
  include, as modeling information items in the modeling information set, the first predetermined number of information items to be processed.

18. The device according to claim 16, wherein the processor is further configured to:
  for a given modeling information item:
    determine a respective territory identity of the modeling information item according to the respective receiver identity of the modeling information item,
    encrypt a respective numerical information item in the modeling information item according to a type of the respective numerical information item in the modeling information item and thereby generate a respective second feature code of the modeling information item, and
    further include, in the respective encrypted information item: the respective territory identity and the respective second feature code.

19. The device according to claim 16, wherein the processor is further configured to:
  consolidate encrypted information items that are included in the plurality of first consolidated information items and that have same respective second consolidation conditions, and thereby create a plurality of second consolidated information items; and
  cluster the plurality of second consolidated information items to create the at least one information template.

20. The device according to claim 19, wherein the processor is further configured to:
  form the plurality of first target encrypted information blocks from the plurality of encrypted information items, such that each of the plurality of encrypted information items included in a first target encrypted information block further has a same territory identity and a same second feature code as each other of the plurality of encrypted information items included in the first target encrypted information block; and for a given first target encrypted information block:
sort encrypted information items in the first target encrypted information block according to receiving times of each of the encrypted information items in the first target encrypted information block, from most recent to least recent.

21. The device according to claim 19, wherein the processor is further configured to:
form a plurality of second target encrypted information blocks from the plurality of first consolidated information items, such that each of the plurality of first consolidated information items included in a second target encrypted information block has a same territory identity and a same second feature code as each other of the plurality of first consolidated information items included in the second target encrypted information block; and for a given second target encrypted information block:
determine a respective number of first consolidated information items included in the second target encrypted information block,
determine a respective most recent receiving time of the first consolidated information items in the second target encrypted information block, and
include, in a respective second consolidated information item: a respective territory identity of the second target encrypted information block, the respective determined number of items of first consolidated information included in the second target encrypted information block, a respective second feature code of the second target encrypted information block, and the respective most recent receiving time of items of first consolidated information in the second target encrypted information block.

22. The device according to claim 19, wherein the processor is further configured to:
divide the plurality of second consolidated information items into a plurality of third target encrypted information blocks, such that each of the plurality of second consolidated information items included in a third target encrypted information block has a same territory identity as each other of the plurality of second consolidated information items included in the third target encrypted information block;
determine a number of first consolidated information items that are consolidated by a second consolidated information item in a third target encrypted information block;
when the determined number of first consolidated information items that are consolidated by the second consolidated information item is greater than a first threshold, include, in an entry: information contents corresponding to the second consolidated information item, the determined number of first consolidated information items that are consolidated by the second consolidated information item, and the most recent receiving time of second consolidated information items in the third target encrypted information block; and
consolidate a plurality of entries included in the third target encrypted information block to create the at least one information template, each of the plurality of entries having same information contents as each other of the plurality of entries, wherein a number of encrypted information items that are applicable to the created at least one information template is a sum of respective numbers of encrypted information items that are consolidated by each of the plurality of entries, and the receiving time of the created information template is the latest receiving time of the plurality of entries.

23. The device according to claim 17, wherein the processor is further configured to:
verify a coverage rate for the at least one information template; and
determine whether to set the at least one information template as an actual information template based on a result of the verifying of the coverage rate.

24. A non-transitory readable storage medium comprising instructions for mining an information template, the instructions configured to, when executed by a processor in a server, cause the server to:
form a modeling information set comprising a plurality of modeling information items;
create a plurality of encrypted information items by encrypting respective numerical information items included in the plurality of modeling information items, wherein to create the plurality of encrypted information items, the processor is configured to:
for a given modeling information item of the plurality of modeling information items:
encrypt a respective receiver identity of the modeling information item and thereby generate a respective first feature code of the modeling information item, and
include, in a respective encrypted information item, the respective first feature code and a respective receiving time of the modeling information item; and
cluster the plurality of encrypted information items and thereby create at least one information template, wherein to cluster the plurality of encrypted information items, the processor is configured to create a plurality of first consolidated information items, and wherein to create the plurality of first consolidated information items, the processor is configured to:
form a plurality of first target encrypted information blocks from the plurality of encrypted information items, such that each of the plurality of encrypted information items included in a first target encrypted information block has a same respective first feature code as each other of the plurality of encrypted information items included in the first target encrypted information block, and
for a given first target encrypted information block of the plurality of first target encrypted blocks:
save an encrypted information item in the respective first target encrypted information block having a most recent respective receiving time and delete each other encrypted information item in the respective first target encrypted information block, and thereby create a respective first consolidated information item.

* * * * *